(12) United States Patent
Gretz

(10) Patent No.: US 6,849,803 B1
(45) Date of Patent: Feb. 1, 2005

(54) ELECTRICAL CONNECTOR

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 518 days.

(21) Appl. No.: 09/792,175

(22) Filed: Feb. 23, 2001

Related U.S. Application Data

(63) Continuation-in-part of application No. 09/603,756, filed on Jun. 26, 2000, now Pat. No. 6,335,488, which is a continuation of application No. 09/165,530, filed on Oct. 2, 1998, now Pat. No. 6,080,933, which is a continuation of application No. 09/007,532, filed on Jan. 15, 1998, now Pat. No. 6,043,432.

(51) Int. Cl.[7] ................................................. H02G 3/18
(52) U.S. Cl. .......................... 174/65 R; 174/167; 16/2.1
(58) Field of Search ........................... 174/65 R, 65 SS, 174/65 G, 152 G, 153 G, 167, 153 R; 439/411, 439, 460, 98; 285/194, 921, 154.1, 140.1; 16/2.1

(56) References Cited

U.S. PATENT DOCUMENTS

| 4,711,472 A |  | 12/1987 | Schnell |  |
| 4,739,126 A | * | 4/1988 | Gutter et al. | 174/65 SS |
| 4,880,387 A |  | 11/1989 | Stikeleather et al. |  |
| 4,990,721 A |  | 2/1991 | Sheehan |  |
| 5,072,072 A | * | 12/1991 | Bawa et al. | 174/65 SS |
| 5,266,050 A | * | 11/1993 | O'Neil et al. | 439/552 |
| 5,373,106 A | * | 12/1994 | O'Neil et al. | 174/65 R |
| 5,422,437 A | * | 6/1995 | Schnell | 174/65 R |

* cited by examiner

*Primary Examiner*—Dhiru R Patel

(57) ABSTRACT

According to the present invention there is provided a snap in locking cable connector with a cylindrical housing having an entry end aperture and an exit end aperture. The entry end aperture can accept the snap-in spring steel adapter of U.S. Pat. No. 6,080,933 as well as the exit end peripheral spring steel locking ring described in this patent to provide a connector that allows rapid and simplified installation of armored cable into a junction or circuit box. The cylindrical housing includes an annular groove or ridge about the inner periphery thereof in the area of the entry end for retention of the spring steel adapter. An electrical cable connector of this type that relies upon frictional or interference fit for retention of the spring steel adapter is also described. Retention of the spring steel adapter with a screw, rivet or similar fastener is also described.

7 Claims, 3 Drawing Sheets

ELECTRICAL CONNECTOR

The present application is a continuation-in-part of patent application Ser. No. 09/603,756, filed on Jun. 26, 2000 now U.S. Pat. No. 6,335,488, which is a continuation of Ser. No. 09/165,530, filed on Oct. 2, 1998 now U.S. Pat. No, 6,080, 933 which is a continuation of Ser. No. 09/007,532 filed on Jan. 15, 1998 now U.S. Pat. No. 6,043,432.

FIELD OF THE INVENTION

The present invention relates to electrical cable clamps, and more specifically to electrical connectors including a back-out prevention feature for securing electrical cables to wiring enclosures.

BACKGROUND OF THE INVENTION

The wiring of electrical devices requires that electrical cables be inserted through openings or holes in junction boxes, panel boxes and the like. Electrical codes generally require that such access holes be substantially filled after insertion of electrical cable and the some means be provided to inhibit retraction of the electrical cable from the access hole after installation to eliminate the possibility of accidental disconnection of the electrical connections internal to the panel box, junction box, etc. The most commonly used connector to provide such utility until recently has been a two-part device that permitted passage of the cabling through a circular collar that passed through the access hole and provided means for securing the cabling inside the circular collar and a lock nut or other means for, in turn, securing the collar to the access hole. Such devices are unwieldy and sometimes difficult to install, especially when space is limited, because of the number of parts involved and the need to apply screw drivers and wrenches to attain proper and secure attachment.

More recently, unitary plastic, strain relief, cable connector clamps, that include a self-locking mechanism as well as a cable retention system have been developed and found broader application. This type of cable clamp or connector is essentially tubular with a slit along one side to enable the connector to be squeezed for insertion into the access bole in the panel box, junction box, etc. It then resiliently returns to its original shape and is provided with protruding ribs to lock it into the opening.

It is common practice to include in the tubular portion of such connectors, clamping elements that resiliently deflect as the cable is inserted, with the free end of the clamping element biased against the cable sheath so as to engage the sheath and thereby prevent the cable from being readily withdrawn from the opening after insertion and installation.

One such device is described in U.S. Pat. No. 5,594,209 to Nattel et al issued Jan. 14, 1997. This patent suggests a connector, as just described, that includes an internal clamping element that has a clamping lip that is resiliently pressed against the cable to prevent its removal from the connector. The clamping lip is described as having a reduced thickness at its free end and including additional projections on the inner wall of the tubular housing, which additional projections have abutment faces perpendicular to the axis of the housing.

U.S. Pat. No. 4,970,350 to Harrington, issued Nov. 13, 1990 describes a similar such connector device comprising a housing having first and second open ends and an inner wall forming a channel extending through the housing for receiving a cable. A coupling means is mounted within the housing for urging the cable towards the inner wall and includes a flange, means for grippingly engaging the cable between the inner wall and the flange, and an elongated bracing pin for providing resistance to bending of the flange.

While both of the foregoing patented devices provide useful solutions to the stated problem of providing a simple to use cable connector, their design is not optimal since they rely largely on simple friction or the presence of a single sharp surface to inhibit "pullout" of the inserted cable. Although the devices described in the foregoing patents allege an ability to retain a wide range of cable diameters, the range of their utility is really quite limited because of their design.

A better arrangement would provide a serrated engagement surface for retaining the inserted cable. Such a design provides a more secure retention of the inserted cable. The use of such a serrated surface, if properly designed, has the additional benefit of being more readily adaptable to a larger variety of cable diameters without sacrificing cable retention capability. The manufacture of such a connector using conventional plastic molding techniques is, however, not simple and requires redesign of the connector to obtain the required serrated contact points in such a process.

U.S. Pat. No. 6,080,933 issued Jun. 27, 2000 in the name of Thomas J. Gretz for, "Snap in Cable Connector" describes a locking cable connector composed of three mating pieces that snap together and provide a connector for helically wound armored or metal clad electrical conductors. A spring steel adapter is used in conjunction with an electrical junction box to fix the location of the locking cable connector with respect to the junction box. The first piece of the snap in locking cable connector is a die cast member including at its inbound end a smooth outer cylindrical section having an outer diameter with flanges that accommodates a spring steel adapter. The second piece is a spring steel locking ring provided to receive a helically wound shielded cable that is inserted into the out end of the die cast member. The locking ring has outwardly directed tangs that allow insertion into the die cast member but restrict withdrawal thereof from the die cast member by virtue of apertures in the walls of the entry end of the die cast cylindrical member. The locking ring also has oppositely or outwardly directed tangs to receive the armored cable and to restrict its movement in the opposite or withdrawal direction.

The spring steel locking ring has a cut out section that permits slight compression so that the locking ring may be easily inserted into the die cast member. Once inserted, the locking ring is able to expand to the full inner diameter of the die cast member to provide a tight and secure fit.

While all such prior art connector devices provide useful solutions to the problem of connecting armored or other cable to electrical boxes of one type or another, they are either relatively costly, if made of cast metal, or may lack adequate strength if molded from plastic. Accordingly, a simplified such connector device fabricated from stamped metal which demonstrates the strength of a cast fitting with a fabrication cost approaching that of a plastic such fitting would be highly desirable.

OBJECTS OF THE INVENTION

It is therefore an object of the present invention to provide a simpler and yet equally easily installed connector for the attachment of electrical cabling to electrical panel boxes, junction boxes and the like.

It is another object of the present invention to provide such a connector that is easily manufactured using conventional metal stamping techniques and therefore demonstrates a fabrication cost approaching that of molded or otherwise formed plastic, yet with the strength of steel.

It is yet a further object of the present invention to provide additional features such as the incorporation of an access port to permit easier extraction of armored cable secured in the snap-in connector of the present invention.

SUMMARY OF THE INVENTION

According to the present invention there is provided a modified stamped sheet metal connector comprising an enhanced cylindrical housing having an entry end aperture and an exit end aperture. The entry end aperture can accept the snap-in spring steel adapter of U.S. Pat. No. 6,080,933 as well as the exit end peripheral spring steel locking ring described in this patent to provide a connector that allows rapid and simplified installation of armored cable into a junction or circuit box. The improved cylindrical housing includes an annular groove or ridge about the inner periphery thereof. In the area for retention of the spring steel adapter. An electrical cable connector of this type that relies upon frictional or interference fit for retention of the spring steel adapter is also described. Retention of the spring steel adapter with a screw, rivet or other similar fastener is also described.

DETAILED DESCRIPTION

This application relates to U.S. Pat. No. 6,604,400 filed concurrently herewith and entitled "Electrical Connector", invented by the same inventor and relates to the continuity of application Ser. No. 09/603,756, now U.S. Pat. No. 6.335.88 which is a continuation of U.S. Pat. No. 6,080,933 which is a continuation of U.S. Pat. No. 6,043,432 all of which applications and patents ar incorporated herein by reference and made a part hereof.

Figure 1:
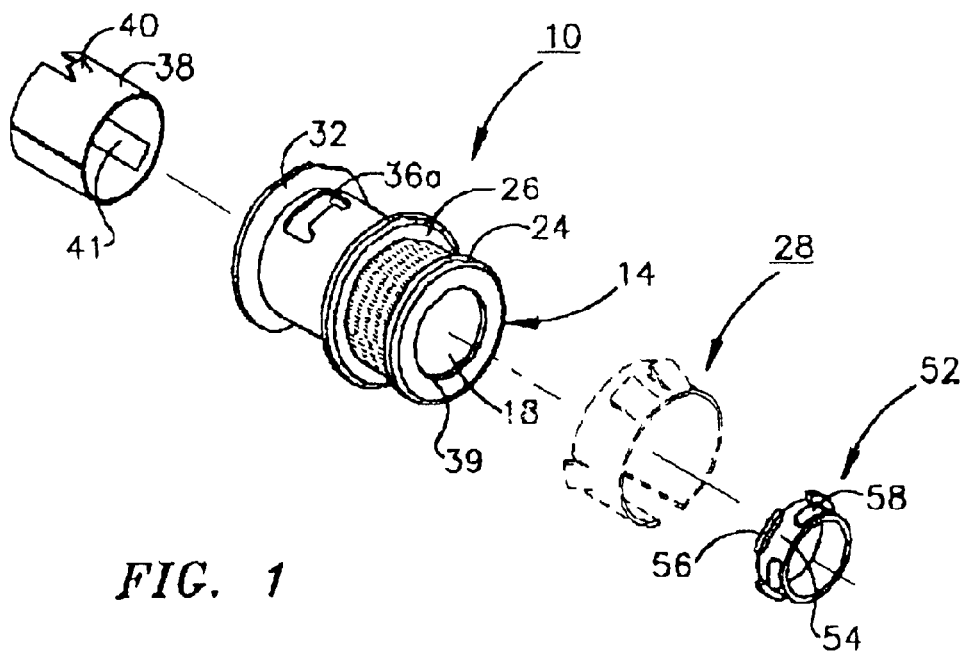
FIG. 1 is an exit side exploded view of the connector of the present invention.
Figure 2:
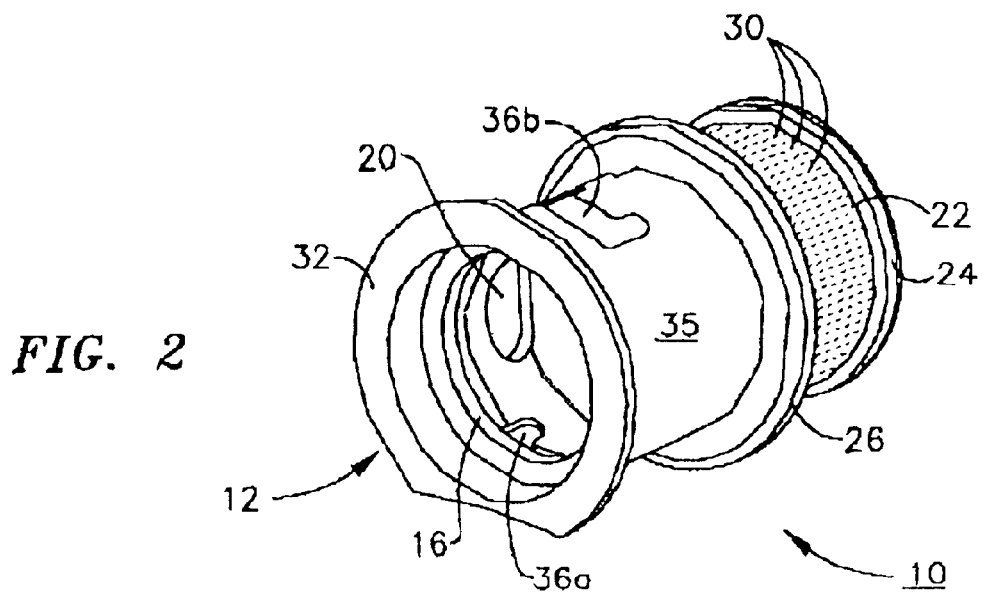
FIG. 2 is an entry side perspective view of the connector of the present invention.

Referring now to FIGS. 1 and 2, the enhanced cylindrical housing 10 of the present invention is provided as a replacement for the die cast member identified as "18" in U.S. Pat. No. 6,080,933, which is hereby incorporated herein by reference in its entirety. Cylindrical housing 10 has an inbound or entry end 12 and an outbound or exit end 14 each including an aperture 16 and 18 respectively. Cylindrical housing 10 further includes an access port 20 whose multiple purposes will be described in greater detail hereinafter. Outbound end 14 further includes outbound end outer periphery 22 including annular flanges 24 and 26 that serve to retain a spring steel locking ring 28. Flange 26 is of a larger diameter than flange 24 to prevent over insertion of spring steel locking 28 as also described below. Spring steel locking 28 is identical to spring steel adapter described in aforementioned and incorporated U.S. Pat. No. 6,080,933. Outbound end outer diameter 22 includes serrations 30 that are stamped, etched, engraved or otherwise formed into the surface of outbound end outer diameter 22. Serrations 30 serve to inhibit rotation of subsequently applied spring steel locking ring 28. According to a highly preferred embodiment of the present invention, a bushing 52 comprising a cylindrical body 54 having a pair of discontinuous flanges 56 and 58 that engage the inner periphery 39 of outbound end aperture 18 is inserted to prevent accidental damage to an inserted cable. Bushing 52 is designed to frictionally engage periphery 39 and is preferably made of a polymeric material tat serves to cushion cable inserted into housing 10 through inbound aperture 16 and exits through outbound aperture 18.

According to a first preferred embodiment, inbound end 12 includes about aperture 16 annular flange 32 that provides a convenient hand gripping surface for the insertion and removal of cylindrical housing 10 to and from an electrical junction box. The circumferential wall 35 of inbound end 12 also includes openings 36a and 36b for engagement of a plurality of tangs 40a of spring steel adapter 38 inserted into inbound end 12. Spring steel adapter 38 according to this embodiment is identical to spring steel adapter "14" as described in U.S. Pat. No. 6,080,933 and incorporates at least three inward extending tangs 41 for engaging an inserted cable thereby restricting its movement in a reverse direction.

Figure 3:
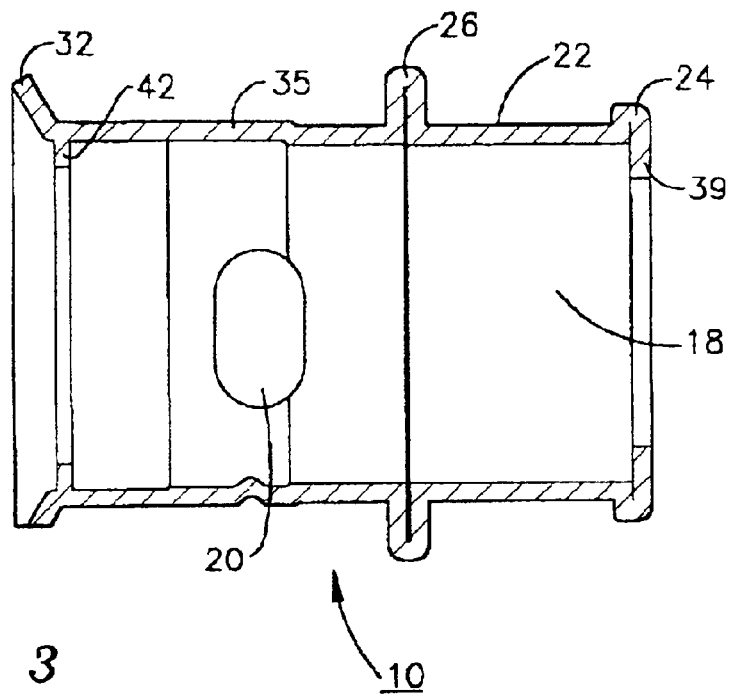
FIG. 3 is an entry side perspective view of an alternative embodiment of the stamped metal cylindrical member of the connector of the present invention.

In the alternative preferred embodiment of cylindrical housing 10 depicted in FIG. 3, tang engagement apertures 36a and 36b and tangs 40 are eliminated in favor of an internal peripheral flange 42 about aperture 16. Internal peripheral flange 42 serves the same purpose as apertures 36a and 36b, namely the retention of a "tangless" spring steel locking ring 38 inside of cylindrical housing 10. The compressabiltiy of spring steel locking ring 38 as described in U.S. Pat. No. 6,080,933 permits insertion of spring steel locking ring 38 into aperture 16 in the same fashion as the spring steel locking ring depicted in FIG. 1 that includes tangs 40.

Figure 4:
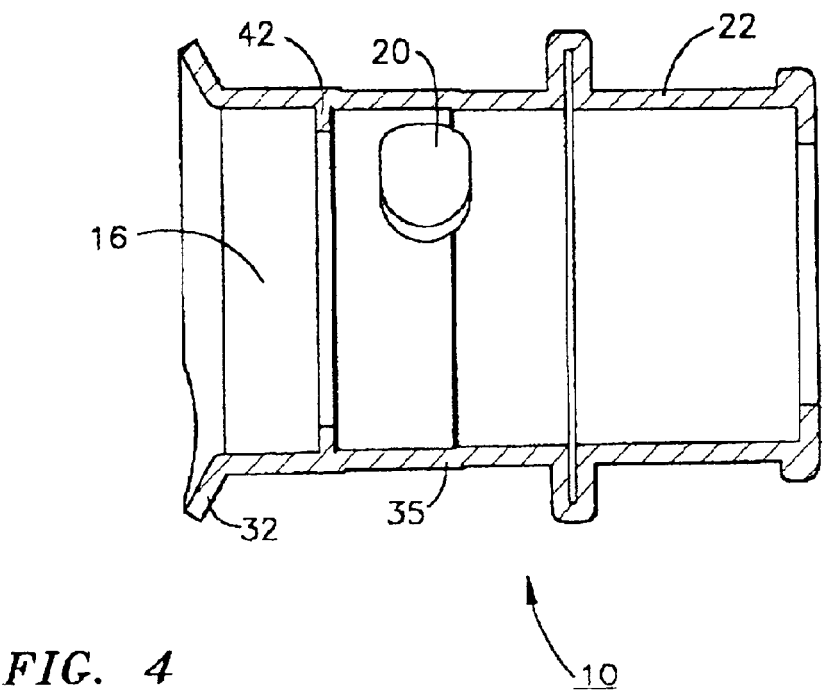
FIG. 4 is a cross-sectional view of a further preferred alternative embodiment of the cylindrical housing of the present invention.

In yet a further preferred embodiment depicted in cross section in FIG. 4, internal peripheral flange 42 is relocated to the position of previously described apertures 36a and 36b and spring steel locking ring 38 includes tangs 40. In this configuration, tangs 40 engage internal peripheral flange or groove 42 in lieu of engaging apertures 36a and 36b, but with the same result that spring steel locking ring 38 and consequently any contained cable are securely retained in position after insertion and connection to an appropriate electrical box.

As a yet further preferred embodiment, tang apertures 36a and 36b as well as annular groove or ridge 42 can be eliminated with tangs 40 to frictionally engage the interior wall of cylindrical housing 10 thereby providing an interference fit for locking ring 38 inside of cylindrical housing 38. In this fashion, locking ring 38 will resist removal after insertion by the action of tangs simply 40 frictionally engaging or gouging into the interior walls of cylindrical housing 38.

Figure 5:
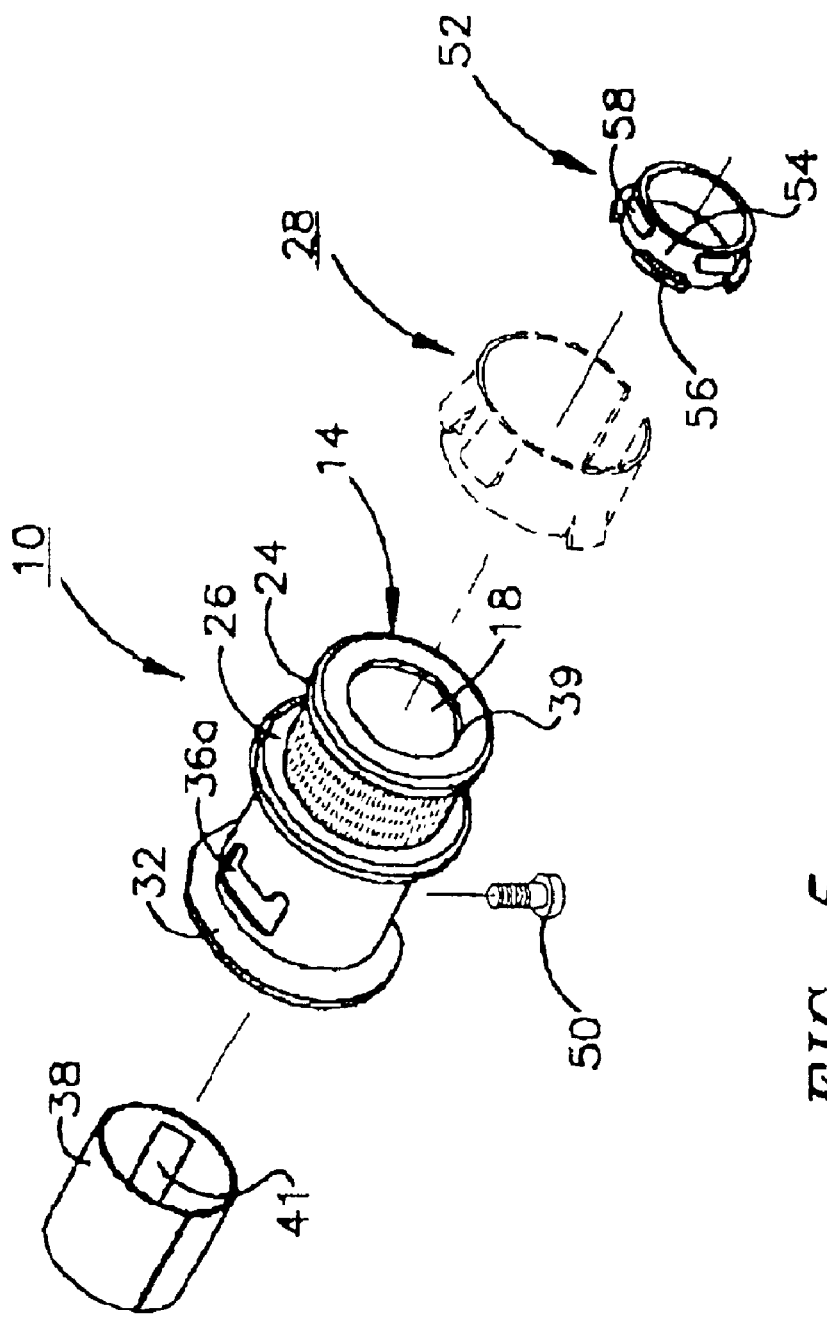
FIG. 5 is an exploded view of an alternative embodiment of the electrical connector of the present invention.

Yet another preferred embodiment of the present invention is shown in FIG. 5. According to this embodiment, tangs 40 have been eliminated and a screw 50 inserted into access port 20 to retain spring steel ring 38 in its proper location. In this case, access port 20 would preferably be threaded to receive screw 50 so that screw 50 can serve as a set or retaining screw. As will be apparent to the skilled artisan, a rivet or similar fastener can be substituted for screw 50 in this embodiment.

In previous iterations of devices similar to that described herein, for example that described in U.S. Pat. No. 6,080,933 some difficulty has been encountered with removal cable from the connector and issues have arisen because of the inability of the installer to see the location of cable ends within the connector. The purpose of previously described access port 20 is to provide both a viewing port to locate the positioning of cable within cylindrical member 10 as well as an added access for the compression of spring steel locking ring 38 when it becomes necessary to remove a previously installed cable.

As the invention has been described, it will be apparent to those skilled in the art that the same may be varied in many ways without departing from the spirit and scope of the invention. Any and all such modifications are intended to be included within the scope of the appended claims.

What is claimed is:

1. In a snap in locking cable connector having a spring steel adapter to join to an electrical junction box to fix a location of the locking cable connector with respect to the junction box, the locking cable connector having mating pieces that snap together to provide a connector for attaching the cable to the junction box comprising:

A) a generally cylindrical housing with an inbound and an outbound end incorporating inbound end and outbound end apertures respectively and a spring steel adapter about said outbound; and B) a spring steel locking ring to receive a cable and lock said cable into said generally cylindrical housing, said spring steel locking ring having a first set of tangs allowing insertion into said generally cylindrical housing but restricting withdrawal motion from said generally cylindrical housing and having a second set of cable gripping tangs oppositely directed to receive the cable and restrict its movement in a reverse direction, the improvement comprising the incorporation of an internal annular flange or groove in said inbound end aperture that engages said first set of tangs thereby restricting withdrawal motion from said generally cylindrical housing.

2. A snap in locking cable connector having a spring steel adapter to join to an electrical junction box to fix a location of the locking cable connector with respect to the junction box, the locking cable connector having mating pieces that snap together to provide a connector for attaching the cable to the junction box comprising:

A) a generally cylindrical housing with an inbound and an outbound end incorporating inbound end and outbound end apertures respectively and a spring steel adapter about said outbound end; and B) a spring steel locking ring to receive a cable and lock said cable into said generally cylindrical housing, said spring steel locking ring having a mechanism allowing insertion into said generally cylindrical housing but restricting withdrawal motion from said generally cylindrical housing and having a second set of cable gripping tangs inwardly directed to receive the cable and restrict its movement in a reverse direction, the improvement comprising the incorporation of an internal annular flange or groove in said inbound end aperture that engages said spring steel locking ring thereby restricting withdrawal motion from said generally cylindrical housing.

3. The cable connector of claim 2 further including an access port in said cylindrical housing wall overlapping said spring steel locking ring.

4. In a snap in locking cable connector having a spring steel adapter to join to an electrical junction box to fix a location of the locking cable connector with respect to the junction box, the locking cable connector having mating pieces that snap together to provide a connector for attaching the cable to the junction box comprising:

A) a generally cylindrical housing having a cylindrical housing wall and an inbound end an outbound end incorporating inbound end and outbound end apertures respectively and a spring steel adapter about said outbound end; and B) a spring steel locking ring to receive a cable and lock said cable into said generally cylindrical housing, said spring steel locking ring having a first set of tangs allowing insertion thereof into said generally cylindrical housing but restricting withdrawal motion from said generally cylindrical housing and having a second set of cable gripping tangs oppositely directed to receive the cable and restrict its movement in a reverse direction, the improvement comprising the incorporation of an access port in said cylindrical housing wall overlapping said spring steel locking ring.

5. A snap in locking cable connector having a spring steel adapter to join to an electrical junction box to fix a location of the locking cable connector with respect to the junction box, the locking cable connector having mating pieces that snap together to provide a connector for attaching the cable to the junction box comprising:

A) a generally cylindrical housing having a cylindrical housing wall and an inbound and an outbound end incorporating inbound end and outbound end apertures respectively and a spring steel adapter about said outbound end; and B) inside of said cylindrical housing, a spring steel locking ring to receive a cable and lock said cable into said generally cylindrical housing, said spring steel locking ring having an inwardly directed set of cable gripping tangs to receive the cable and restrict its movement in a reverse direction;

an access port in said cylindrical housing wall overlapping said spring steel looking ring; and a fastener in said access port restraining withdrawal of said spring steel locking ring from inside of said cylindrical housing.

6. The snap in locking cable connector of claim 5 wherein said fastener is a screw and said access port is threaded to engage said screw.

7. The snap in locking cable connector of claim 5 wherein said fastener is a rivet.

* * * * *